United States Patent
Hill et al.

(10) Patent No.: US 8,702,350 B2
(45) Date of Patent: Apr. 22, 2014

(54) RISER ASSEMBLY

(75) Inventors: Tricia Hill, Katy, TX (US); Yanqiu Zhang, Houston, TX (US)

(73) Assignee: Wellstream International Limited, Newcastle-upon-Tyne (GB)

( * ) Notice: Subject to any disclaimer, the term of this patent is extended or adjusted under 35 U.S.C. 154(b) by 13 days.

(21) Appl. No.: 12/297,307

(22) PCT Filed: Apr. 20, 2007

(86) PCT No.: PCT/GB2007/001434
§ 371 (c)(1),
(2), (4) Date: Oct. 15, 2008

(87) PCT Pub. No.: WO2007/125276
PCT Pub. Date: Nov. 8, 2007

(65) Prior Publication Data
US 2009/0279957 A1   Nov. 12, 2009

(30) Foreign Application Priority Data

Apr. 27, 2006  (GB) .................................. 0608327.3

(51) Int. Cl.
*E21B 17/01*   (2006.01)
(52) U.S. Cl.
USPC ....................................................... 405/224.3
(58) Field of Classification Search
USPC ........ 405/211, 212, 224.2, 224.4, 223.1, 224, 405/224.3, 158, 171; 166/350, 367; 441/4, 441/28, 29, 133; 138/120, 155, 103, 124, 138/127, 132, 133
See application file for complete search history.

(56) References Cited

U.S. PATENT DOCUMENTS

| | | | | |
|---|---|---|---|---|
| 2,955,626 | A | * | 10/1960 | Hartley .......................... 141/279 |
| 3,768,842 | A | * | 10/1973 | Ahlstone .......................... 285/55 |
| 4,123,860 | A | * | 11/1978 | De Koning et al. ............. 37/336 |
| 4,153,079 | A | * | 5/1979 | Ambrose ....................... 138/104 |
| 4,176,986 | A | * | 12/1979 | Taft et al. ....................... 405/211 |
| 4,634,314 | A | * | 1/1987 | Pierce ........................ 405/224.2 |
| 6,004,074 | A | * | 12/1999 | Shanks, II .................. 405/195.1 |
| 6,123,114 | A | * | 9/2000 | Seguin et al. ................. 138/124 |
| 6,155,748 | A | * | 12/2000 | Allen et al. ................ 405/195.1 |
| 6,364,022 | B1 | * | 4/2002 | Kodaissi et al. .............. 166/367 |
| 6,595,293 | B2 | * | 7/2003 | Carter ........................... 166/345 |

(Continued)

FOREIGN PATENT DOCUMENTS

| | | | |
|---|---|---|---|
| GB | 2291686 | A * | 1/1996 |
| GB | 2387635 | A | 10/2003 |

(Continued)

OTHER PUBLICATIONS

International Search Report and Written Opinion of the International Searching Authority, mailed Jul. 25, 2007, for corresponding International Application No. PCT/GB2007/001434.

(Continued)

*Primary Examiner* — Sunil Singh
(74) *Attorney, Agent, or Firm* — Klarquist Sparkman, LLP

(57) ABSTRACT

A riser assembly and method for providing buoyancy to a riser assembly are disclosed. The riser assembly which is of the type for transporting fluids from a sub-sea flowline to a floating structure comprises a first segment of flexible pipe, a further segment of flexible pipe and a rigid buoyancy support for providing at least one buoyancy element at the support.

23 Claims, 5 Drawing Sheets

(56) References Cited

U.S. PATENT DOCUMENTS

| | | | |
|---|---|---|---|
| 7,008,141 B2 * | 3/2006 | Fitzgerald et al. | ......... 405/224.2 |
| 2003/0180097 A1 * | 9/2003 | Fitzgerald et al. | ......... 405/224.2 |
| 2005/0241832 A1 | 11/2005 | Jones | |

FOREIGN PATENT DOCUMENTS

| | | |
|---|---|---|
| GB | 2393426 A | 3/2004 |
| WO | WO01/41549 A | 6/2001 |
| WO | WO03/031765 A | 4/2003 |
| WO | WO2004/033848 A | 4/2004 |

OTHER PUBLICATIONS

International Preliminary Report on Patentability and Written Opinion of the International Searching Authority, mailed Oct. 28, 2008, for corresponding International Application No. PCT/GB2007/001434.

* cited by examiner

RISER ASSEMBLY

CROSS REFERENCE TO RELATED APPLICATIONS

This is the U.S. National Stage of International Application No. PCT/GB2007/001434, filed Apr. 20, 2007, which in turn claims the benefit of Great Britain Application No. GB0608327.3, filed Apr. 27, 2006.

The present invention relates to a riser assembly and a method for providing a riser assembly including one or more buoyancy modules. In particular, but not exclusively, the present invention relates to a riser assembly providing one or more rigid buoyancy supports at junctions between the segments of flexible pipe in a riser. Buoyancy modules can be secured to the rigid support or are provided integrally therewith so that abrasion or other damage the flexible pipe body is obviated.

Traditionally flexible pipe is utilised to transport production fluids, such as oil and/or gas and/or water, from one location to another. Flexible pipe is particularly useful in connecting a sub-sea location to a sea level location. Flexible pipe is generally formed as an assembly of a pipe body and one or more end fittings. The pipe body is typically formed as a composite of layered materials that form a pressure-containing conduit. The pipe structure allows large deflections without causing bending stresses that impair the pipe's functionality over its lifetime. The pipe body is generally built up as a composite structure including metallic and polymer layers.

In known flexible pipe design the pipe includes one or more tensile armour layers. The primary load on such a layer is tension. In high pressure applications, such as in deep water and ultra deep water environments, the tensile armour layer experiences high tension loads from the internal pressure end cap load as well as weight. This can cause failure in the flexible pipe since such conditions are experienced over prolonged periods of time.

Unbonded flexible pipe has been an enabler for deep water (less than 3,300 feet (1,005.84 meters)) and ultra deep water (greater than 3,300 feet) developments for over 15 years. The technology enabled the industry to initially produce in deep water in the early 90's and then to ultra deep waters up to around 6,500 feet. (1,981.2 meters) in the late 90's. Water depths greater than 6,500 feet push the envelope where typical free-hanging riser configurations can operate. High tension loads from free-hanging pipe weight coupled with high pressure loads creates a challenge for any riser system.

With oil and gas production in deep water and ultra deep water continuing to grow, the industry is seeking to go to water depths greater than 6,500 feet. There is therefore a continuing need to advance unbonded flexible pipe capabilities and riser system solutions accordingly.

One technique which has been attempted in the past to in some way alleviate the above-mentioned problems is the addition of buoyancy aids at predetermined locations along the length of the riser. However, the securing of buoyancy aids has led to increased compression loads being exerted on the pipe body. This occurs when a clamp or other securing mechanism is closed about the pipe body to secure a buoyancy module to the riser. The clamp induces compressive loads which add to the extant hydrostatic loads and can lead to riser failure.

It is an aim of the present invention to at least partly mitigate the above-mentioned problems.

It is an aim of embodiments of the present invention to provide a riser assembly and method for manufacturing a riser assembly able to operate in water depths of about 10,000 feet (3,048.0 meters).

It is an aim of embodiments of the present invention to provide a riser assembly to which buoyancy modules can be secured or are included integrally so as to provide the advantages of a buoyed riser without the disadvantages associated with connecting such buoyancy to the riser.

According to a first aspect of the present invention there is provided a riser assembly for transporting fluids from a sub-sea flow line to a floating structure, comprising:
 a first segment of flexible pipe;
 a further segment of flexible pipe; and
 a rigid buoyancy support for providing at least one buoyancy element at said support.

According to a second aspect of the present invention there is provided a method for providing buoyancy at one or more desired locations on a riser assembly, comprising the steps of:
 providing a riser assembly comprising a plurality of segments of flexible pipe;
 proximate to a junction between said segments, providing a rigid buoyancy support; and
 securing at least one buoyancy element to said support.

Embodiments of the present invention provide a riser assembly which can accommodate combined loading of high internal pressure and tension.

Embodiments of the present invention provide a riser assembly in which topside dynamic loads can be decoupled from free-hanging weight. In this way movement of the floating structure, such as that caused by movement of the top or surface vessel which induces loads in the pipe, can be overcome by providing buoyancy at at least one location along the length of the riser. This helps separate out the inertia of the top of the flexible pipe from the bottom region. Effectively this provides a quasi-static touchdown region at at least one location along the length of the flexible pipe.

Embodiments of the present invention provide a method for securing buoyancy modules to a flexible pipe via a rigid structure. The material forming the rigid structure provides a sufficient surface to affix buoyant material to the flexible pipe. The buoyancy modules may be attached in a variety of ways, such as clamping, welding, mechanically or other acceptable fastening techniques. Alternatively, according to further embodiments of the present invention, buoyancy modules may be made integral with a rigid structure. In this sense the buoyancy modules do not need to be attached. The buoyancy modules can be any type of element which has an increased buoyancy with respect to the flexible pipe. Notable examples are syntactic foam or steel tanks or others.

Embodiments of the present invention will now be described hereinafter, by way of example only, with reference to the accompanying drawings in which.

In the drawings like reference numerals refer to like parts.

Figure 1:
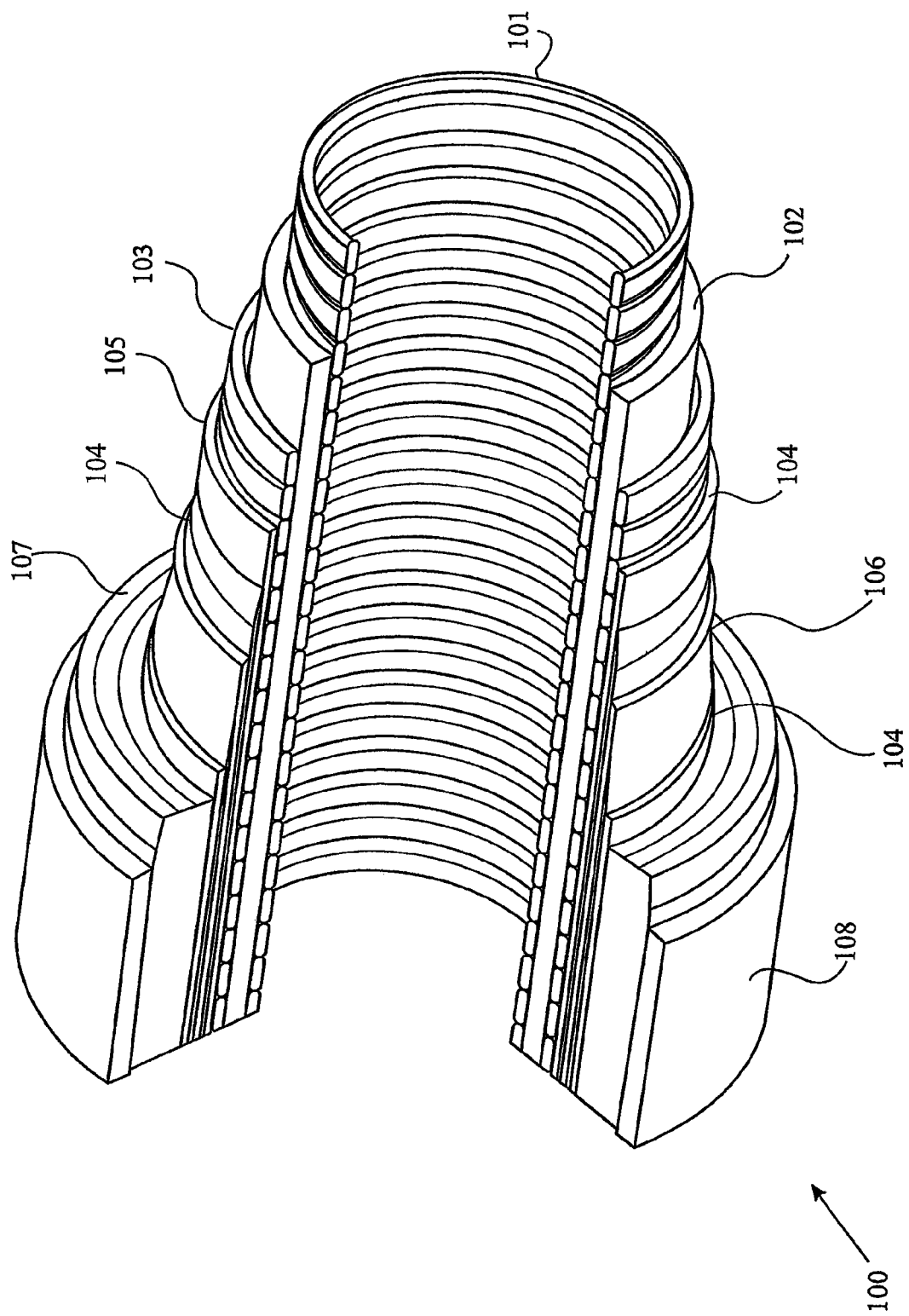
FIG. 1 illustrates a flexible pipe body.

Throughout this specification reference will be made to a flexible pipe. It will be understood that a flexible pipe is an assembly of a pipe body and one or more end fittings in each of which an end of the pipe body is terminated. FIG. 1 illustrates how a pipe body 100 is formed from a composite of layered materials that form a pressure-containing conduit. Although a number of particular layers are illustrated in FIG. 1, it is to be understood that the present invention is broadly applicable to composite pipe body structures including two or more layers.

As illustrated in FIG. 1, a pipe body typically includes an inner most carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads.

The internal pressure sheath 102 typically comprises a polymer layer that ensures internal-fluid integrity. It is to be understood that this barrier layer may itself comprise a number of sub-layers.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes layers of insulation 107 and an outer sheath 108 which comprises a polymer layer used to protect the pipe against penetration of seawater and other external environments, corrosion, abrasion and mechanical damage.

Each flexible pipe comprises at least one segment of pipe body 100 together with an end fitting located at at least one end of the flexible pipe. An end fitting provides a mechanical device which forms the transition between the flexible pipe body and a connector or further end fitting. The different pipe layers as shown, for example, in FIG. 1 are terminated in the end fitting in such a way as to transfer the load between the flexible pipe and the connector.

Figure 2:
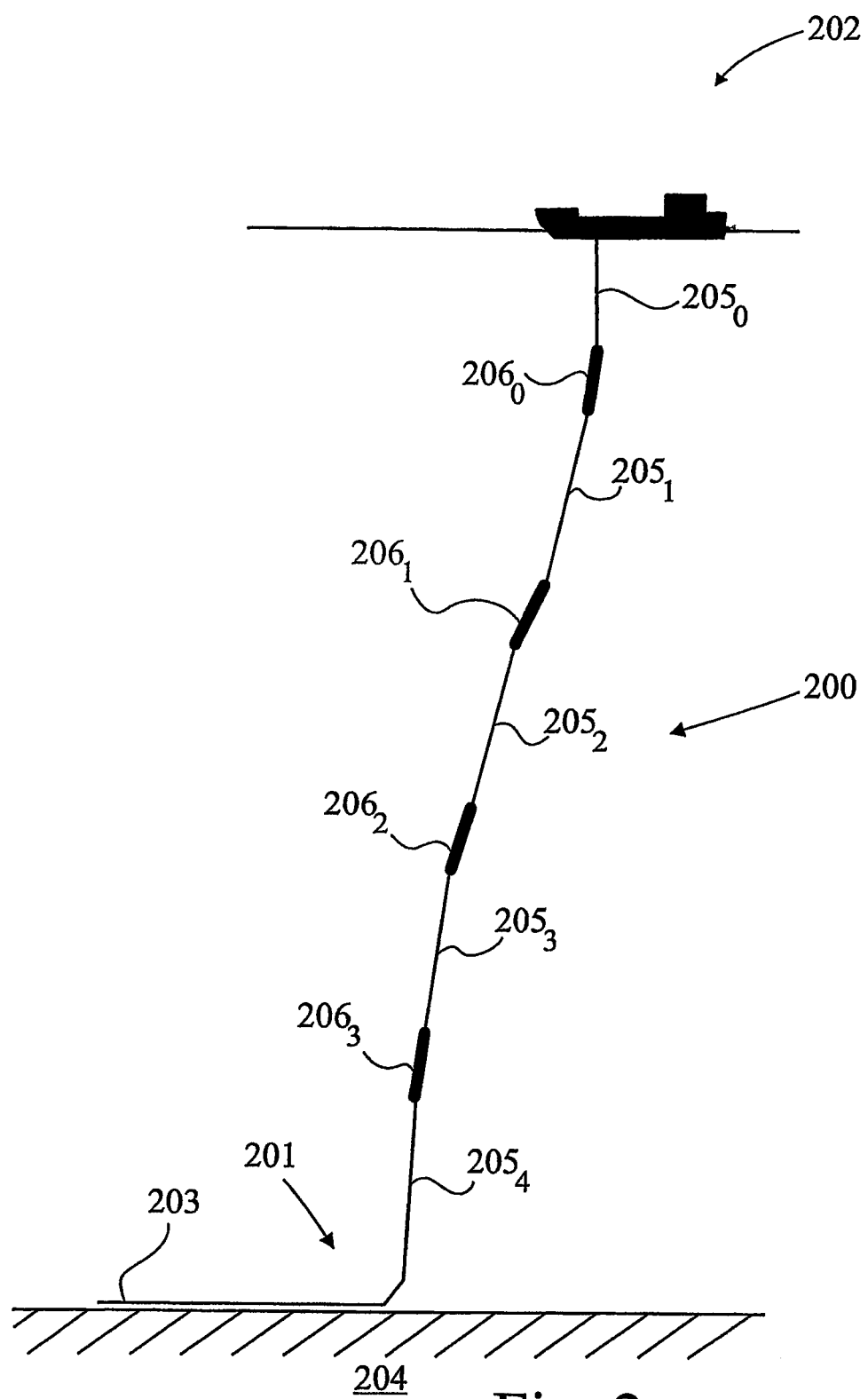
FIG. 2 illustrates a catenary riser having a loose distribution of buoyancy.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 203 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation. The flexible pipe includes five segments of flexible pipe body $205_0$ to $205_4$ and four junctions $206_0$ to $206_3$ between adjacent segments of pipe body.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

Figure 3:
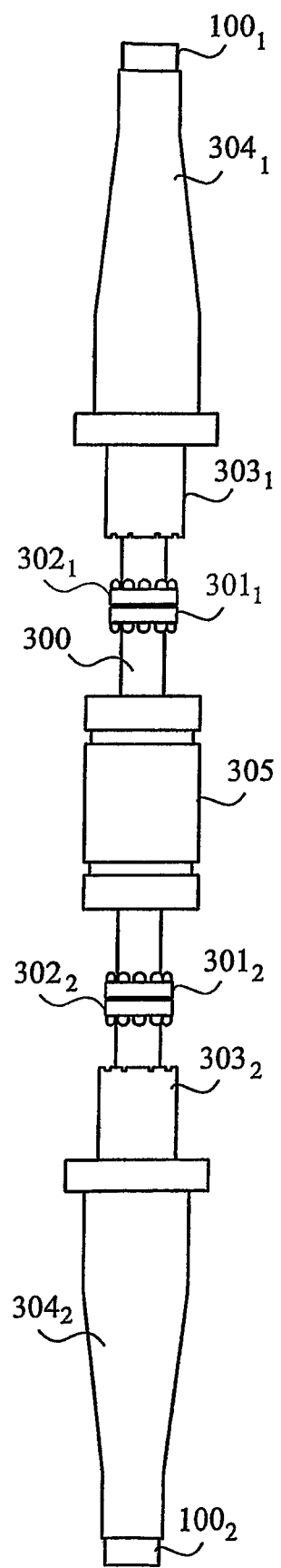
FIG. 3 illustrates a rigid support for a buoyancy module.

FIG. 3 illustrates how a rigid buoyancy support can be connected to a riser assembly at a junction 206 so that one or more buoyancy elements may be located at that junction. The rigid buoyancy support is in the form of a rigid elongate pipe 300 having a first connector 301 at a first end thereof and a second connector 302 at a second end thereof. Each connector is connected to a mating connector $302_1$, $302_2$ of an end fitting 303 adjacent segments of flexible pipe. Each end fitting 303 terminates a portion of a flexible pipe body 100 in a respective segment of flexible pipe. A bend stiffener 304 is secured to each end fitting 303 so as to gradually stiffen the flexible pipe 100 to match the rigidity of the end fitting body 303. As shown in FIG. 3 end fittings from adjacent segments of flexible pipe are thus arranged in a back-to-back and spaced apart arrangement with the spacing between adjacent end fittings being bridged by the rigid buoyancy support 300. A buoyancy module 305 which forms any element having a buoyancy greater than the parts of the riser and which may be for example a syntactic foam cylinder or steel tank or other buoyancy element is secured to the rigid buoyancy support 300 in a conventional manner such as by clamping the buoyancy element 305 to the support 300. It will be understood that in accordance with embodiments of the present invention more than one buoyancy module may be used at a junction between adjacent segments of flexible pipe. Also the buoyancy elements may be made integral with the buoyancy support.

The purpose of the rigid buoyancy support is to provide a rigid structure for the buoyancy to attach to or be integral with in the flexible pipe configuration. The rigid buoyancy support provides a robust surface on which can be attached added buoyancy material. As noted above, the rigid material may be inserted in line with the flexible riser. The material provides a sufficient surface to affix buoyant material to the flexible pipe. The buoyant material may be attached in a variety of ways, namely, by clamp, welding, mechanically or any acceptable fastening technique.

Figure 4:
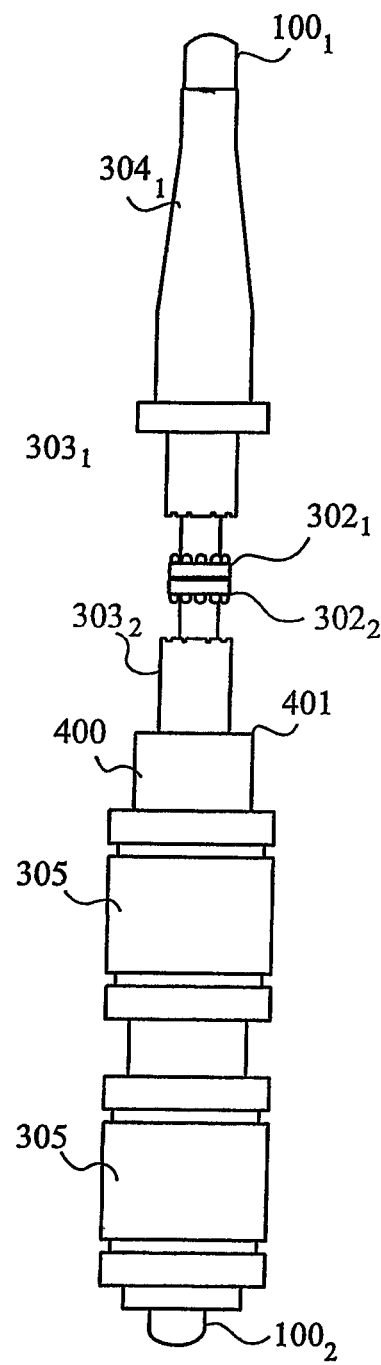
FIG. 4 illustrates a rigid support for two buoyancy modules.

FIG. 4 illustrates an alternative embodiment of the present invention in which a rigid buoyancy support 400 is formed as an elongate rigid sheath. The sheath is secured at a first end 401 thereof to the body portion $303_2$ of an end fitting. A connector $302_2$ terminates the end fitting body $303_2$ and this connector $302_2$ is connected to a matching connector $302_1$ of an adjacent end fitting $303_1$. The further end fitting $303_1$ is connected to an associated flexible pipe body $100_1$ and a bend stiffener $304_1$ is secured to the end fitting $303_1$.

As illustrated in FIG. 4, end fittings 303 of adjacent segments of flexible pipe are thus arranged in a back-to-back configuration and connected directly together. A rigid support 400 is secured to the end fitting of one segment although it will be appreciated that a rigid buoyancy support could also be secured to the end fitting $303_1$ of the further end fitting. This might be in addition to, or as an alternative to, the connection of the support to the end fitting $303_2$.

The rigid buoyancy support may be formed from any appropriate rigid material such as steel or others and one or more buoyancy modules 305 can be secured to the support in any appropriate manner as noted above. It will be understood that embodiments of the present invention are not restricted to the application of any specific number of buoyancy elements. It is also to be understood that as an alternative to securing buoyancy elements to the rigid support 400 the buoyancy elements may be formed integral with the support 400.

The flexible pipe $100_2$ extends over a zone encompassed/surrounded by the sheath 400. An end of the flexible pipe body $100_2$ is terminated in the respective end fitting $303_2$ whilst the further end of the pipe body $100_2$ extends away from the junction between the adjacent segments of flexible pipe.

Advantageously the rigid sheath 400 may include more than one layer and in particular an inner layer having an inner diameter which matches or is in some way correlated with an outer diameter of the flexible pipe. The material of the inner most layer of the rigid support may be selected so that abrasion of the outer surface of the flexible pipe is reduced and/or obviated completely.

Embodiments of the present invention thus improve the long term reliability of the buoyancy position in a riser configuration. Clamping buoyancy directly to the flexible pipe as is customary in prior art shaped riser configurations may not be suitable for deep water applications where the flexible pipe polymer layers are more susceptible to creep under high external pressure loads. The benefit of the present invention is the rigidity and versatility of the rigid buoyancy supports employed. Reliability of the buoyancy position is to be gained and this reliability is key in any stepped riser configuration. Whereas with prior art buoyancy affixing techniques there exists an industry wide anticipation that buoyancy modules may move over time, with embodiments of the present invention buoyancy movement can be mitigated so that the location of buoyancy elements along the length of the riser can be more precisely predicted and thus the benefits of any shaped riser system can be maximised.

An advantage of the rigid buoyancy support is to provide a rigid structure to attach buoyancy elements on which may be secured in-line with the flexible riser. If prior art techniques are used and the buoyancy is clamped directly to the flexible pipe, the non-metallic flexible pipe layers may change in diameter due to material creep decreasing the clamping force. If the clamping force is not sufficient the buoyancy may slip on the pipe altering the riser configuration and potentially jeopardising the riser structure integrity.

Figure 5:
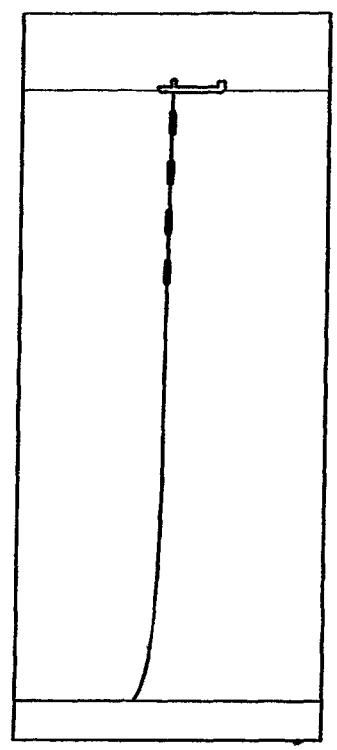
FIG. 5A illustrates a vertical riser configuration having a buoyancy distribution in which the buoyancy elements are closely distributed.
FIG. 5B illustrates a catenary riser system again in which buoyancy elements are closely distributed.
FIG. 5C illustrates a vertical riser system in which buoyancy elements are arranged in a loose distribution.
FIG. 5D illustrates a catenary riser system again using a loosely distributed arrangement of buoyancy elements.
Figure 5:
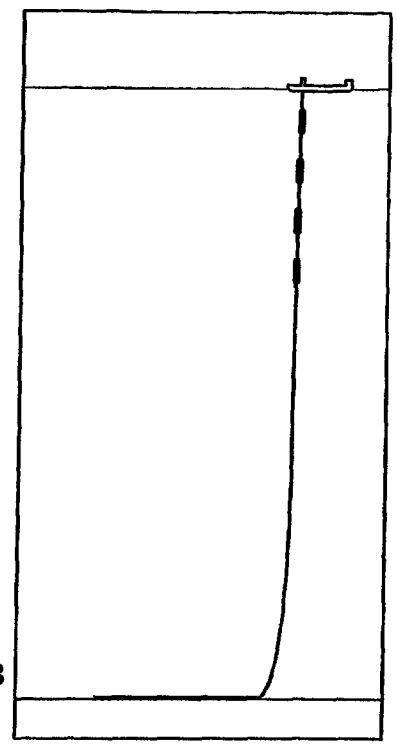
Figure 5:
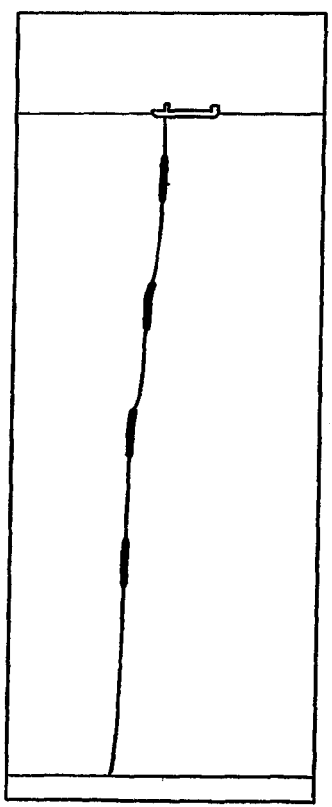
Figure 5:
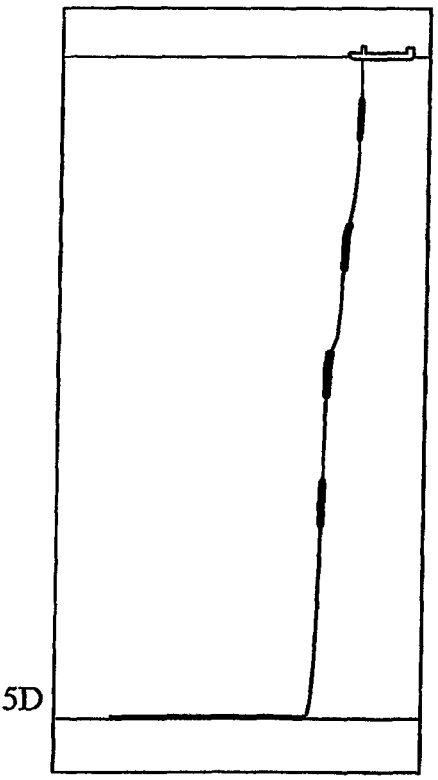

Embodiments of the present invention can be used in a wide variety of riser configurations, also with a variety of distributed buoyancy configurations. For example, FIG. 5 illustrates four possible options in which embodiments of the present invention may be deployed. It is to be understood that the invention is not restricted to use in these specific arrangement types.

FIG. 5A illustrates a vertical riser configuration having a buoyancy distribution in which the buoyancy elements are closely distributed.

FIG. 5B illustrates a catenary riser system again in which buoyancy elements are closely distributed.

FIG. 5C illustrates a vertical riser system in which buoyancy elements are arranged in a loose distribution.

FIG. 5D illustrates a catenary riser system again using a loosely distributed arrangement of buoyancy elements.

Embodiments of the present invention provide the advantage that collapse capability is not a limiting factor. Also the compression in touch-down regions is very low and perhaps avoidable.

Furthermore, embodiments of the present invention provide the advantage that if a positive tension is maintained the risk of bird cage is avoided.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A riser assembly for transporting production fluids such as oil, gas and/or water from a sub-sea flow line to a floating structure, comprising:
   plural segments of flexible pipe each of which is formed as a composite structure of two or more unbonded layers, the layers including an internal sheath for ensuring fluid integrity and a pressure armour layer provided over the internal sheath for resisting internal and external pressure; and
   a rigid buoyancy support having at least one buoyancy element at said support, wherein said buoyancy support comprises a rigid pipe member connected at a first and second end thereof in an in-line configuration to an end fitting of two of the plural segments of flexible pipe;
   wherein the rigid buoyancy support comprises a plurality of rigid buoyancy supports spaced apart along the length of the riser assembly, each rigid buoyancy support for supporting at least one buoyancy element, and each rigid buoyancy support being connected in an in-line configuration to a respective pair of segments of flexible pipe;
   wherein the plural segments of flexible pipe are relatively more flexible than the rigid pipe members of the rigid buoyancy supports;
   wherein all of the buoyancy elements of the riser assembly are mounted on rigid pipe members.

2. The riser assembly as claimed in claim 1 wherein each of the plural segments of flexible pipe comprises a portion of flexible pipe body as the respective composite structure.

3. The riser assembly as claimed in claim 2 wherein at least one of the plural segments of flexible pipe further comprises a bend stiffener element secured to a respective end fitting and extending over a zone of the respective flexible pipe body.

4. The riser assembly as claimed in claim 1 wherein:
   each buoyancy element is secured to a respective buoyancy support.

5. The riser assembly as claimed in claim 1 wherein:
   each buoyancy element is integral with a respective buoyancy support.

6. The riser assembly as claimed in claim 1 wherein said floating structure comprises one of a platform and/or buoy and/or ship.

7. The riser assembly as claimed in claim 1 wherein said sub-sea location comprises a flow line and/or sea-floor installation and/or sub-sea platform.

8. The riser assembly as claimed in claim 1, wherein the internal sheath comprises a polymer layer and the pressure armour layer comprises a helically wound material.

9. The riser assembly of claim 1, wherein the layers of the composite structure further include an outer sheath provided over the pressure armour layer.

10. The riser assembly of claim 1, wherein there are no buoyancy elements mounted on the plural segments of flexible pipe.

11. A riser assembly for transporting production fluids such as oil, gas and/or water from a sub-sea flow line to a floating structure, comprising:
a first segment of flexible pipe;
a further segment of flexible pipe wherein the first and further segments of flexible pipe are formed as a composite structure of two or more unbonded layers, the layers including an internal sheath for ensuring fluid integrity and a pressure armour layer provided over the internal sheath for resisting internal and external pressure; and
a rigid buoyancy support having at least one buoyancy element at said support, wherein
said buoyancy support comprises a rigid sheath member connected to an end fitting of one of said first and further segments of flexible pipe, said sheath member being arranged to extend concentrically over a portion of flexible pipe body of the one of said first and further segments of flexible pipe.

12. The riser assembly as claimed in claim 11, wherein:
said sheath member has an inner diameter matching a diameter of an outer surface of said portion of flexible pipe body.

13. The riser assembly as claimed in claim 11, wherein each segment of flexible pipe comprises a portion of flexible pipe body as the respective composite structure.

14. The riser assembly as claimed in claim 13, wherein a segment of flexible pipe further comprises a bend stiffener element secured to a respective end fitting and extended over a zone of the respective flexible pipe body.

15. The riser assembly as claimed in claim 11 wherein the at least one buoyancy element is secured to the buoyancy support.

16. The riser assembly as claimed in claim 11 wherein the at least one buoyancy element is integral with said support.

17. The riser assembly of claim 11, wherein the layers of the composite structure further include an outer sheath provided over the pressure armour layer.

18. A method for providing buoyancy at one or more desired locations on a riser assembly for transporting production fluids such as oil, gas and/or water, comprising the steps of:
providing a riser assembly comprising a plurality of segments of flexible pipe wherein each of the segments of flexible pipe are formed as a composite structure of two or more unbonded layers, the layers including an internal sheath for ensuring fluid integrity and a pressure armour layer over the internal sheath for resisting internal and external pressure;
providing a plurality of a rigid pipe members having buoyancy elements mounted thereon, wherein the rigid pipe members are relatively more rigid than the segments of flexible pipe; and
connecting opposing ends of each rigid pipe member to an end fitting of an adjacent flexible pipe segment such that each rigid pipe member is connected to two flexible pipe segments in an in-line configuration;
wherein all of the buoyancy elements of the riser assembly are mounted on rigid pipe members.

19. The method as claimed in claim 18 further comprising the steps of: providing a bend stiffener on each end fitting.

20. The method as claimed in claim 18 further comprising the steps of:
providing a bend stiffener on a remainder end fitting of said respective end fittings.

21. The method as claimed in claim 18 wherein said step of providing providing a plurality of rigid pipe members comprises providing at least one rigid pipe member integral with at least one buoyancy element.

22. The method as claimed in claim 18 wherein said step of providing providing a plurality of rigid pipe members further comprises securing the buoyancy elements to the rigid pipe members.

23. A method for providing buoyancy at one or more desired locations on a riser assembly for transporting production fluids such as oil, gas and/or water, comprising the steps of:
providing a riser assembly comprising a plurality of segments of flexible pipe wherein each of the segments of flexible pipe are formed as a composite structure of two or more unbonded layers, the layers including an internal sheath for ensuring fluid integrity and a pressure armour layer over the internal sheath for resisting internal and external pressure;
proximate to a junction between said segments, providing a rigid buoyancy support; and
providing at least one buoyancy element at said support, wherein
said step of providing a rigid buoyancy support further comprises the steps of:
connecting respective end fittings of adjacent flexible pipe segments together in a back-to-back configuration; and
securing a rigid sheath member to a one of said end fittings, said sheath member extending concentrically over a portion of a flexible pipe body terminated in one end fitting.

* * * * *